US006304968B1

(12) United States Patent
Hacker et al.

(10) Patent No.: US 6,304,968 B1
(45) Date of Patent: Oct. 16, 2001

(54) METHOD AND DEVICE FOR ASSIGNING AN AUTHORIZATION DEVICE TO A BASE STATION

(75) Inventors: Heidrun Hacker, Hemmingen; Stephan Schmitz, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/155,689

(22) PCT Filed: Jan. 30, 1998

(86) PCT No.: PCT/DE98/00281

§ 371 Date: Jan. 26, 1999

§ 102(e) Date: Jan. 26, 1999

(87) PCT Pub. No.: WO98/34200

PCT Pub. Date: Aug. 6, 1998

(30) Foreign Application Priority Data

Feb. 4, 1997 (DE) ............................................. 197 03 999

(51) Int. Cl.[7] ...................................................... G06F 11/00

(52) U.S. Cl. .......................... 713/153; 713/170; 713/169; 713/162

(58) Field of Search .................................... 713/170, 169, 713/162, 153

(56) References Cited

U.S. PATENT DOCUMENTS

| | | | | |
|---|---|---|---|---|
| 5,251,203 | * | 10/1993 | Thompson | 370/13.1 |
| 5,289,542 | * | 2/1994 | Kessler | 380/9 |
| 6,055,638 | * | 4/2000 | Pascal et al. | 713/201 |
| 6,101,608 | * | 8/2000 | Schmidt et al. | 713/202 |
| 6,154,839 | * | 11/2000 | Arrow et al. | 713/154 |

FOREIGN PATENT DOCUMENTS

| | | | |
|---|---|---|---|
| 197 43 101 A 1 | 9/1997 | (DE) . | |
| 197 43 101 | 5/1998 | (DE) . | |
| 0 029 560 | 6/1981 | (EP) | G01S/13/76 |
| 0 285 419 | 10/1988 | (EP) | G07C/9/00 |
| 0 479 058 | 4/1992 | (EP) | G01S/13/02 |

* cited by examiner

*Primary Examiner*—Thomas R. Peeso
*Assistant Examiner*—Todd Jack
(74) *Attorney, Agent, or Firm*—Kenyon & Kenyon

(57) ABSTRACT

A method and a device for allocating an authentication device to a base station, with the base station delivering a search signal which is received by the authentication device and is compared with a previously stored reference signal assigned to a base station. If the search signal matches a reference signal, the authentication device sends a response signal. If they do not match, the authentication device checks whether the search signal matches another previously stored reference signal allocated to another base station.

8 Claims, 2 Drawing Sheets

METHOD AND DEVICE FOR ASSIGNING AN AUTHORIZATION DEVICE TO A BASE STATION

FIELD OF THE INVENTION

The present invention relates to a method and device for allocating an authentication device to a base station.

BACKGROUND INFORMATION

German Patent Application No. 196 45 769 describes a method for allocating a authentication device to a base station. An authentication device designed as a remote control is allocated to a base station belonging to a motor vehicle in particular in a two-step method, the base station emitting a search signal in a first allocation step to detect any authentication devices present within the signal range. Any authentication devices present will receive the search signal, compare it with a reference signal stored in a memory and respond by sending back a "present" signal if the search signal and reference signal match. This sending back takes place at a time which is characteristic of the respective authentication device sending it back and is based on receipt of the call signal. The base station can unambiguously identify which authentication elements are present on the basis of this characteristic time. It then selects one of those present and performs an allocation verification in the second allocation step. This method makes it possible to allocate multiple authentication devices to one base station, and to guarantee that the allocation will be performed rapidly.

SUMMARY OF THE INVENTION

An object of the present invention is to provide a method for allocating an authentication device multiple base stations.

The method according to the present invention permits allocation of one authentication device to multiple base stations, such as the allocation of one remote control to multiple motor vehicles, to various buildings or to both buildings and vehicles at the same time, without a user having to perform special actions. This method works very rapidly since at first an authentication device to be allocated is merely recognized directly on the basis of a search signal delivered by the base station after a unilateral signal transmission, and only then is the allocation verified. It is also advantageous that the number of base stations that can be allocated to one authentication device may be limited to a number suitable for the intended application.

DETAILED DESCRIPTION

Figure 1:
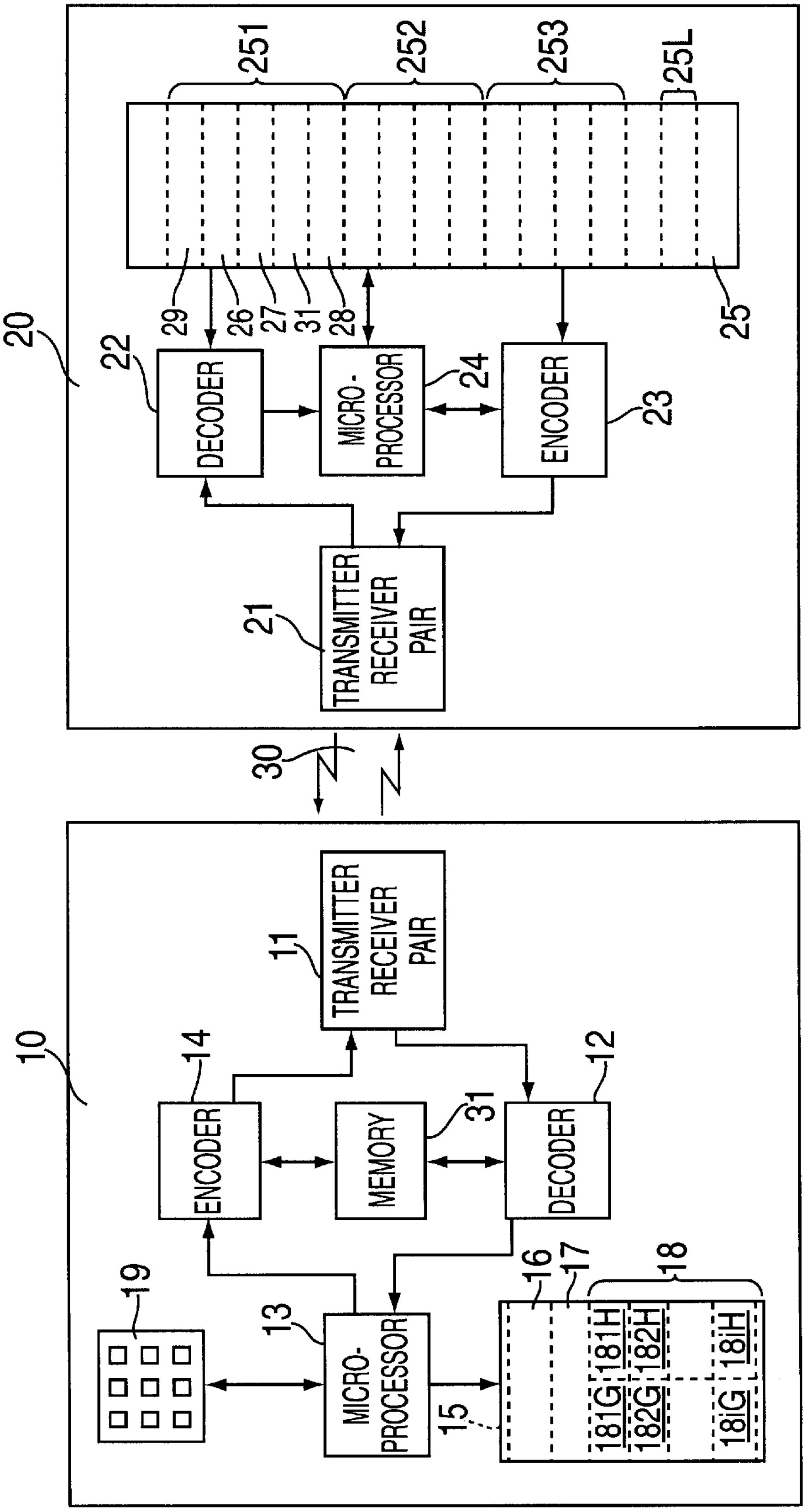
FIG. 1 shows a block diagram of an allocation device in accordance with the present invention.

FIG. 1 shows a base station 10 which is part of a device or an object or is fixedly allocated to such. For example, the base station may be part of the access equipment to a building or a motor vehicle. An authentication device 20, referred to below as a remote control, is allocated functionally to base station 10 over a signal transmission link 30 in a non-contact manner. One remote control 20 may be allocated to a plurality of base stations 10, and base stations 10 may belong to different technical facilities. For example, one remote control may be allocated to a vehicle and a building at the same time. Remote control 20 may be a transponder, for example. Base station 10 and remote control 20 together form an overall system, which is referred to here as a telecontrol system.

The core of base station 10 is a microprocessor 13 which triggers and monitors the output of signals by base station 10 in particular and analyzes incoming signals. It has a memory 15 which contains a program for executing an allocation check dialogue. Microprocessor 13 is connected to a transmitter/receiver pair 11 for delivering and receiving signals to and from a remote control 20. Signals to be delivered or received by transmitter/receiver pair 11 are partially encoded. Therefore, an encoder 14 is connected between microprocessor 13 and transmitter/receiver pair 11 to encode outgoing signals, and a decoder 12 is provided to decode incoming signals. To perform the coding and decoding, encoder and decoder 12 each access a memory 31 which holds a cryptographic code key that is characteristic of base station 10. In addition, microprocessor 13 has another memory 15 containing, among other things, a serial number 16, a manufacturer's code 17 and a directory 18 with group numbers 181G, 182G, . . . , 18iG, where i=1, 2, . . . , M, of remote controls 20 allocated to base stations 10 and to manufacturer's codes 181H, 182H, . . . , 18iH, belonging to the group numbers, where i=1, 2, . . . , M, of the remote controls. Serial number 16 is a code which is characteristic of a base station 10 and all allocated remote controls 20. Manufacturer's code 17 is issued by the manufacturer of base station 10 and provides unambiguous identification; group numbers 181G, 182G, . . . , 18iG serve to differentiate between remote controls 20 having the same serial numbers 16 allocated to a common base station 10. In addition, microprocessor 13 is connected to actuating means 19 which allow a user to have a manual influence on the function of microprocessor 13 and are designed as a keypad, for example, as indicated in FIG. 1; any other embodiments, such as a voice data entry system, are likewise possible.

Remote control 20 has a transmitter/receiver pair 21 corresponding to transmitter/receiver pair 11 on the base station end for receiving signals emitted by base station 10 and for emitting signals to base station 10. Like base station 10, transmitter/receiver pair 21 has a decoder 22 downstream from it for decoding encoded signals. This is connected to a microprocessor 24 which processes signals received via transmitter/receiver pair 21 and decoder 22 and initiates certain actions depending on and following the result. In particular, microprocessor 24 monitors the delivery of signals to base station 10 over transmitter/receiver pair 21. This is usually done in encoded form to prevent interception or simulation. Therefore, as in the case of base station 10, an encoder 23 is connected between microprocessor 24 and transmitter/receiver pair 21.

To perform the signal processing in remote control 20, i.e., decoding incoming signals and coding outgoing signals, and to control the operation of microprocessor 24, a memory 25 is provided for decoder 22, encoder 23 and microprocessor 24. It is divided into a plurality of areas 251, 252, 253, . . . , 25n, where n=1, 2, 3, . . . , L, three of which are indicated for the sake of simplicity. Each memory area 251, . . . 25n contains a memory location 26 for storing a serial number, a memory location 27 for storing a group number and a memory location 31 for storing a cryptographic key. The function of the codes deposited in memory locations 26, 27, 31 corresponds to that of the codes with the same designations stored in memory 15 of base station 10. Thus, serial number 26 is a code which is characteristic of a telecontrol system that includes base station 10 and respective authentication devices 20; it is expediently determined by the manufacturer or the user of the overall device and is identical to serial number 16 present in base station 10. Group number 27 (corresponding to a group number entry 18iG in directory 18 in memory 15 of base station 10) serves to differentiate among several remote controls 20 having this same serial number. It is assigned to remote control 20 by base station 10 in a special learning mode. Decoder 22 and encoder 23 use the cryptographic key stored in memory 31 to decode incoming signals and encode outgoing signals. Depending on the communication method used, this key is identical to that deposited in memory 31 of the base station or it is related to it. Each memory area 251, . . . , 25n also has a location for depositing use information concerning the scope of functions of a base station 10. For example, when used in a motor vehicle, the action radius for the validity of a base station 20 may be limited to a certain value by use information 28. In addition, memory 25 also has a manufacturer's code 29 assigned to remote control 20 by the manufacturer.

Serial numbers, cryptographic code keys and use information deposited in a memory area 251, . . . , 25n are assigned to an individual base station 10. One remote control 20 can thus be assigned to multiple (L) base stations corresponding to the number of memory areas 251, . . . , 25n. Number L is expediently set at a value based on the intended application. In the case of remote controls for motor vehicles and buildings, this value may be four, for example, for devices intended for private individuals, or 500, for example, for devices intended for vehicle rentals.

Between base station 10 and remote control 20 there is a communication link 30 for transmission of signals transmittable by a non-contact method between transmitter/receiver pair 11 on the apparatus end and transmitter/receiver pair 21 on remote control 20 end. Infrared signals or high-frequency signals are expediently used as signal carriers.

Figure 2:
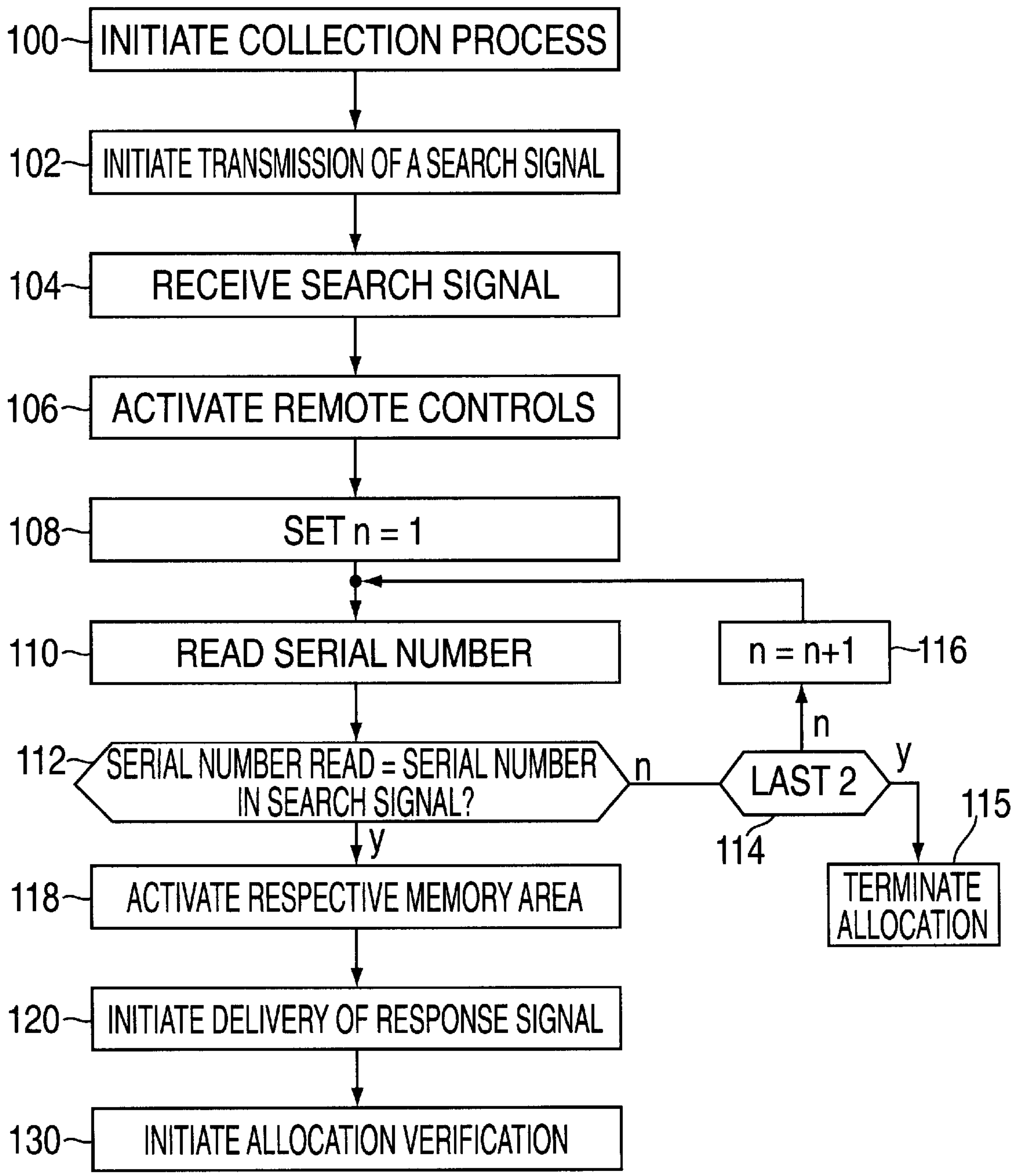
FIG. 2 shows a flow chart to illustrate the operation of the allocation device according to the present invention.

The operation of the device shown in FIG. 1 is explained below on the basis of the flow chart in FIG. 2. Each step of the process is preceded by a letter B or F, indicating whether the respective step takes place in base station 10(B) or in remote control 30(F). The allocation process is usually initiated by the user by operating a mechanical, electrical or electro-optical tripping mechanism, for example (step 100). In the case when it is used for the door of a motor vehicle, the tripping mechanism may consist of operation of the door handle, for example. In this way, microprocessor 13 of base station 10 initiates the transmission of a search signal by transmitter/receiver pair 11 (step 102). The search signal contains a start sequence, preferably in the form of a start bit, for activating remote controls 20 and serial number 16 deposited in memory 15. This sequence is preferably not encoded. The search signal is received by all remote controls 20 within the range of communication link 30 via their transmitter/receiver pair 21 (step 104). All remote controls 20 thus reached are then activated (step 106) and determine whether they are assigned to base station 10 sending the search signal. For this purpose, they set a running index n on value 1 (step 108) and then load serial number 26 out of first memory area 251 of memory 25 into microprocessor 24. The start bit transmitted at the same time serves to synchronize microprocessor 24 with the received search signal. Microprocessor 24 then checks whether the serial number read out of first memory area 251 matches the serial number transmitted in the search signal (step 112). If this check shows that they do not match, microprocessor 24 determines whether the serial number thus checked comes from last memory area 25L (step 114). If that is not the case, it increases running index n by 1 (step 116) and repeats steps 110 and 112. If all memory areas 251, 252, . . . 25L have been checked and no match has been found with respect to the serial number transmitted with the received search signal, the allocation is terminated (step 115).

If a check in step 112 shows that the received serial number matches the stored serial number, microprocessor 24 activates respective memory area 25n and initiates the delivery of a response signal to base station 10 (step 120). The response signal is expediently a short, simple signal, e.g. group number 26 from activated memory area 25n. Furthermore, the received serial number may also be sent back as the response signal to transmitting base station 10, with this feedback taking place in a given time window after receipt of the search signal. Base station 10 is also notified of the group number in this way. The latter method is also explained in greater detail in German Patent Application No. 196 45 769.6, which reference is herewith made.

After receipt of the response signal from remote control 20, microprocessor 13 at the base station end initiates an allocation verification, preferably by the conventional challenge-response method. Base station 10 delivers via its transmitter/receiver pair 11 an encoded signal which is received by remote control 20, decoded, recoded with the help of the manufacturer's code and the cryptographic code key from activated memory area 25n, coded again in encoder 23 and sent back as a response signal to base station 10 via transmitter/receiver pair 21. Meanwhile, microprocessor 13 of base station 10 determines the required response signal from the challenge signal sent previously. The calculation is performed from the challenge signal according to a given algorithm using the cryptographic code key deposited in memory 31 and manufacturer's code 181H, 182H, . . . , 18iH of the remote control derived from the group number and stored in memory 15. Microprocessor 13 compares the required response signal with the response signal received by remote control 20. If the two do not match, base station 10 and remote control 20 do not belong together. Microprocessor 13 then initiates the subsequent actions provided for this case, e.g., blocking the device assigned to base station 10 to prevent its use. There is expediently then some indication to the user, e.g., by an optical or acoustic display, that no allocation has taken place. Additional connection measures may also be provided, such as repeating the allocation procedure starting with step 102. If the allocation verification yields a match between the response signal and the required response signal determined in microprocessor, there is a confirmation that the allocation is correct. This is expediently done in a manner that can be perceived visually or acoustically by the user, and it leads to release of the device allocated to base station 10, for example.

What is claimed is:

1. A method of allocating an authentication device to a base station, comprising the steps of:

transmitting a search signal by a first one of a plurality of base stations;

receiving the transmitted search signal by the authentication device;

comparing the received search signal to a first one of a plurality of previously stored reference signals, the first one of the previously stored reference signals being assigned to one base station of the plurality of base stations;

comparing the received search signal to a second one of the previously stored reference signals if the received search signal does not match the first one of the previously stored reference signals, the second one of the previously stored reference signals being assigned to a second base station of the plurality of base stations; and transmitting a response signal by the authentication device if the received search signal matches one of the plurality of previously stored reference signals.

2. The method according to claim 1, further comprising the steps of:

receiving the response signal by the first one of the plurality of base stations; and initiating an allocation verification by the first one of the plurality of base stations, the allocation verification checking for a presence of a matching cryptographic code key in the first one of the plurality of base stations and the authentication device.

3. The method according to claim 1, wherein the search signal is an unencoded signal and wherein a plurality of authentication devices store a same search signal as one of the plurality of previously stored reference signals.

4. The method according to claim 1, further comprising the steps of:

if the search signal matches one of the plurality of previously stored reference signals, activating additional previously stored information by the authentication device and transmitting at least some of the additional previously stored information to the first one of the plurality of base stations by the authentication device in a signal exchange.

5. An authentication device, comprising:

a memory storing reference signals, the reference signals being assigned to different base stations;

a receiver receiving search signals transmitted by a base station;

a processing device comparing received search signals to the stored reference signals; and a transmitter sending a response signal when one of the received search signals matches one of the stored reference signals.

6. The authentication device according to claim 5, wherein the processing devices compares the received search signals to the stored reference signals, one after another.

7. The authentication device according to claim 5, wherein if one of the received search signals matches one of the stored reference signals, the processing device activates additional information stored in the memory, the additional information for verifying allocation of the base station.

8. The authentication device according to claim 5, wherein a number of storage locations for storing the stored reference signals and a number of possible allocations to base stations are limited based on an intended application.

* * * * *